United States Patent [19]

Morita

[11] Patent Number: 4,735,869

[45] Date of Patent: Apr. 5, 1988

[54] OPTICAL FILM

[75] Inventor: Yoshio Morita, Tokyo, Japan

[73] Assignee: Merck Patent Gesellschaft mit beschrankter Haftung, Darmstadt, Fed. Rep. of Germany

[21] Appl. No.: 925,637

[22] PCT Filed: Jan. 7, 1986

[86] PCT No.: PCT/EP86/00003

§ 371 Date: Sep. 18, 1986

§ 102(e) Date: Sep. 18, 1986

[87] PCT Pub. No.: WO86/04323

PCT Pub. Date: Jul. 31, 1986

[30] Foreign Application Priority Data

Jan. 18, 1985 [JP] Japan ................................ 60-5884

[51] Int. Cl.$^4$ .................... G02B 5/28; B05D 5/06; B32B 9/00; B32B 19/00
[52] U.S. Cl. .................................. 428/702; 350/166; 427/165; 427/169; 427/299

[58] Field of Search .............. 427/164, 165, 169, 299, 427/307, 309; 428/689, 702; 350/166

[56] References Cited

U.S. PATENT DOCUMENTS 3,619,235 11/1971 Furuuchi et al. ............... 427/169 X
3,984,591 10/1976 Plumat et al. ...................... 427/165
4,272,588 6/1981 Yoldas et al. ................... 427/165 X
4,596,745 6/1986 Chao .............................. 427/165 X

FOREIGN PATENT DOCUMENTS 0008215 2/1980 European Pat. Off.
0090260 10/1983 European Pat. Off.
2072300 9/1971 France.

Primary Examiner—Michael R. Lusignan
Attorney, Agent, or Firm—Millen & White

[57] ABSTRACT

Process of forming a titanium dioxide film with controlled optical thickness on a surface comprising a pretreating step, at least one film-forming step and optionally a nucleation step between the pretreating and film-forming step, and articles coated with such a film.

15 Claims, No Drawings

OPTICAL FILM

This invention relates to optical films on articles and especially to a process of forming a titanium dioxide optical film by aqueous solution reaction, in particular to a process to make titanium dioxide films which exhibit controlled interference colors. The optical film is a thin film whose optical thickness, defined by the product "nd" of the refractive index "n" and the actual dimensional thickness "d" is in the order of magnitude of the visible light wave lengths. As commonly known, it is used for such optical purposes as antireflection coatings and interference filters, as well as for ornamental purposes to impart decorative effect to glassware, porcelain or plastics where such substances having high refractive indices, such as zinc sulfide, bismuth oxichloride, stannic oxide or titanium dioxide, are used in thin films, exploiting the irridescent effect (colors produced by interference of light) which the thin films of these substances produce.

Among these substances, titanium dioxide is widely used in various ornamental purposes such as luster glaze for china because of its very high refractive index and chemical stability. This invention can be applied not only for the above ornamental purposes but also for optical purposes and ornamental multilayer films which require more strict control of optical thickness (hereinunder to be referred to as "nd"). Thin films of titanium dioxide are also used for preparing nacreous pigments by coating the surface of mica (muscovite) flakes for decorative purposes.

The known methods for making a thin film of titanium dioxide are classified into four groups. The first is a vacuum deposition process which is the surest for obtaining a uniform film thickness in principle, but due to the fact that titanium dioxide cannot readily be vacuum-evaporated ion-spattering methods are employed. For example, Japanese Patent Prepublication Showa No. 58-12564 describes a process under a vacuum of $5 \times 10^{-5}$ Torr with an oxygen partial pressure of $10^{-4}$ Torr, wherein titanium dioxide is vaporized by means of an electron gun and deposited onto the substrate surface heated to 100°–350° C.

As seen in this example, the vacuum deposition process requires special equipment and accordingly the size of objects is limited by its capacity, which must have certain economic limitation, and the process costs are high.

The second method is a vapor decomposition which is characterized by thermal decomposition of titanium tetrachloride vapor on the heated surface of substrate in a vapor mixture with steam. Its process control is complex and reproducibility is low, so that film formation with uniform thickness is difficult. The iridescent effect cannot be distributed uniformly over a wide surface area of this method.

The third group are solution-coating or melt-coating methods. A solution of titanium compound is either coated at room temperature to form a surface film and then heated for thermal decomposition, or such solution, or otherwise a pulverized solid titanium compound, is sprayed over a heated substrate surface to realize the film formation and thermal decomposition simultaneously. In the Japanese Patent Publication Showa No. 52-1406, for example, a solution of organic titanium compound is sprayed over a heated glass surface. Iridescent films obtained by this method have fine spots of different colors, which spoil the color effect of the whole surface and the performance expected from the high refractive index of titanium dioxide cannot be attained. A further example of Japanese Patent Prepublication Showa No. 58-49645 describes that window panes exhibiting reflection of 31–39% for the range of the visible light are obtained by spraying pulverized tetramethoxy titanium over the heated surface of glass panels. The obtained titanium dioxide films, however, are colorless and uniformity of optical thickness is not mentioned. In any case, these coating methods have the intrinsic drawback that formation of a film with uniform "nd" over an undulated surface is impossible and that they cannot be used for optical purposes which require strict control of "nd".

The fourth method is the hydrolysis of an aqueous solution of titanium compound in which the substrate is immersed. The hydrolysate deposits onto the substrate surface, and forms a film. When the hydrolysate is not titanium dioxide, it is calcined afterwards for conversion to titanium dioxide. For example, in the Japanese Patent Publication Showa No. 49-3824, nacreous pigments are obtained by thermal treatment of mica flakes coated by gradual neutralization of an aqueous titanium trichloride solution to deposit the hydrolysate onto the mica surface. Generally the processes of deposition in solution permit some uniform conditions for the deposition of hydrolysate over the whole surface of substrate, regardless of its contour, because the surface is soaked in the mother liquor which is isotropic. The known processes, however, are all directed to substrates of large specific area, such as mica flakes and glass beads, and are not applicable to the objects of comparatively small specific surface area such as glassware, glass panels, china and porcelain. The aforementioned process of Japanese Patent Publication Showa No. 49-3824, for example, produces nacreous pigments exhibiting interference colors of white, yellow, red, blue and green by the deposition of hydrolysate onto the mica surface while suppressing the formation of free hydrolysate precipitate particles by maintaining the relationship between the total substrate surface area and the rate of hydrolysis in a fixed range, but there is no mention of iridescent film on any glass substrate. The hydrolysate in this process is described as hydrous titanium dioxide, which is converted by thermal treatment to titanium dioxide comprising mainly anatase.

It has been known since long ago that thermal hydrolysis of an aqueous solution of titanium salt results in precipitation of titanium dioxide, either of rutile or anatase, depending on the conditions. An example which seems to have realized direct deposition of titanium dioxide onto mica surface is seen in either of the U.S. Pat. Nos. 3,087,827 or 3,087,829.

The titanium salt used there was a sulfate, and obviously the resultant titanium dioxide was anatase. Tracing of this method using a glass beaker. As the reaction vessel does not result in optical film formation on the inner surface of the beaker.

An article of Kogyo Kagaku Zasshi, Vol. 59, No. 11 on page 65 describes that boiling a solution of titanium tetrachloride dissolved in 17% hydrochloric acid precipitates rutile-type titanium dioxide. It also describes that temperature below 75° C. favor anatase formation. Carrying out such reactions using a glass beaker does not result in the formation of optical film on its inner surface.

As seen above, all known processes in solution are incapable of forming a uniform optical film with controlled optical thickness of titanium dioxide on the substrate surface. The only way to realize uniform optical film of titanium dioxide was the vacuum deposition by ion-spattering. No processes that allow direct deposition of titanium dioxide onto the substrate surface of any contour by means of hydrolysis in solution were known at all. Particularly, formation of an iridescent film with uniform color on a surface that has a negative curvature like the inner surface of a glass bottle, was definitely impossible.

This invention has realized for the first time such formation of titanium dioxide films with controlled optical thickness of a desired value without restriction from the contour of the substrate surface.

The purpose of this invention is to form a uniform titanium dioxide optical film of consistent "nd", for any desired value of "nd", on the surface of objects, particularly glass, enamel, china, porcelain, natural stones and polymers forming glass-like articles; in particular to form an iridescent film of rutile-type titanium dioxide on the surface of objects having small specific surface areas and any contour by means of aqueous solution reaction.

It is well known that when titanium dioxide is used as a material for the purpose of light reflection, the rutile type which has higher refractive index is superior to anatase. The conditions for the formation of rutile, however, are more restricted than those for anatase.

The inventor disclosed a method to produce strong, metallic luster and distinct interference color by triple layer obtained by laminating titanium dioxide films and a silica film in Japanese Patent Publication Showa No. 42-6809, but was not successful in its industrialisation because of difficulty in controlling "nd". A method was found for the silica layer to obtain a coating of uniform thickness by solution reaction (Japanese Patent Publication No. 49-46480), but no method was found to obtain titanium dioxide layers with an uniform film by reaction in aqueous solution. Generally, hydrolysis of titanium salt in aqueous solution under various conditions with such objects as glass or porcelain etc. submerged therein, produces only opaque films on the surface, showing no luster. Even if some lusterous film results, its reproducibility is extremely low and the film is neither uniform nor completely clear showing inferior luster and color compared to those obtained by said vacuum deposition or solution application method.

The reason for the formation of only turbid films probably is that whereas by the hydrolysis a multitude of nuclei are formed which grow to precipitate particles, the surface of the substance to be coated such as glass does not allow the growth of the substance that constitutes the precipitate particles, hence those nuclei grow exclusively at first in the form of very minute particles, which subsequently deposit onto the substrate surface of e.g. glass. In said Japanese Patent Publication No. 49-3824 there is a description: "glass plates are submerged in a suspension of mica flakes . . . preventing free hydrated titanium dioxide nuclei from staying in the suspension", but such passive means cannot realize the target of the present invention. The inventor tried various methods of pretreatment for the purpose to change the surface of glass and other substrates into a surface with a similar nature to that of said nuclei, and finally a film-forming method was found for precipitating a titanium dioxide layer as a uniform coating by means of aqueous solution reaction, resulting in the success of producing novel decorative effects never seen in conventional products in high reproducibility and in a practicable manner.

Therefore, the object of this invention is a process of forming a titanium dioxide film with controlled optical thickness on a surface comprising the following steps:

(a) a pretreating step wherein the surface to be coated is heated in an acidic aqueous solution together with a water-soluble titanium ester or titanium salt, thereby forming a deposit on the surface, and/or the surface is soaked in an aqueous solution containing at least one member of the group consisting of ferrous, ferric, stannous and stannic salts, optionally together with a polyol.

(b) a least one film-forming step wherein the deposit obtained according to (a) is soaked at a temperature of at least 75° C. in an acidic aqueous solution containing at least 0.3 millimole Ti/l, (c) optionally a nucleation step to be performed between (a) and (b) wherein the pretreated surface is soaked in an acidic aqueous solution of a titanium ester and/or titanium salt containing at least 0.1 millimole Ti/l, followed by a baking at at least 300° C.

A further object of the invention are articles coated with a thin titanium dioxide film prepared according to the above process.

The materials which are suitable for such a process are surfaces of nonsoluble inorganic materials, such as glass, enamel, china, porcelain, natural stones or other siliceous substances, mica flakes or metal objects, or surfaces of organic polymer material.

The surfaces should be provided preferably with hydroxyl groups either constitutionally or by introducing hydroxyl groups on the surface by known modification procedures.

Preferred materials are glass, china, porcelain, polycarbonate or mica flakes.

The process to form a titanuim dioxide film on the above mentioned surfaces comprises a pretreating and a film-forming step and optionally a nucleation step before the film formation.

The pretreatment comprises either only a coating with the hydrolysate of a titanium ester or titanium salt or only a soaking in an aqueous solution containing at least one member of the group consisting of ferrous, ferric, stannous and stannic salts, optionally together with a polyol; the two possible steps may be combined in sequence.

The titanate ester used for said pretreatment process is the generic term for substances obtained by condensation of a compound belonging to either lower monovalent alcohols or to a polyol group with a titanium salt such as titanium tetrachloride and titanium trichloride, including a product obtained by dissolving the precipitates from neutralization of an aqueous solution of titanium salt in a liquid polyol under heating. The lower monovalent alcohol can be an alkanol, such as methanol, ethanol and/or isopropranol which dissolves titanium tetrachloride to give dichlorotitanate esters, and the polyol can be selected from polyols such as glycerol, erythritol and sorbitol, mono-alkyleneglycols and polyalkyleneglycols, or from compounds belonging to mono- or disaccharides which are reacted with a concentrated aqueous solution of titanium tetrachloride or -trichloride to obtain a resinous or syrup-like product. The above dichlorotitanate ester of monovalent lower alcohol can be obtained also by a condensation reaction where a concentrated aqueous solution of titanium tetrachloride and an excessive amount of lower monovalent alcohol is heated. In the case of liquid polyol such as glycerol or ethyleneglycol, a method to disperse the precipitate of titanate gel resulting from neutralization of a cold aqueous solution of a tetravalent titanium salt in an excess amount of a liquid polyol can be employed.

The saccharide can, for example, be glucose, sucrose or any conventional sugar belonging to either mono- or disaccharides, and it is mixed with a concentrated solution of titanium tetrachloride at room temperature to obtain a viscous liquid material. When a polyol such as glycerol is used, a resinous product solid at room temperature is obtained after dehydration by heating. In the case of a polyol, the proportion to one mole of titanium tetrachloride employed is at least 0.1 mole hydroxyl groups.

Use of excessive polyol to leave unreacted polyol has no detrimental influence on the purpose of this invention. Heating of concentrated titanium tetrachloride solution without admixture of a polyol boils down to a transparent residue but a solution of this product has no effect on the present invention. Even with a small proportion of polyol such as 0.1 mole hydroxyl per 1 mole titanium results in a resinous condensate and its dilute aqueous solution presents the effect of the present invention. A range of 0.5 to 4 moles hydroxyl per mole titanium, however, is preferred for storage stability of the aqueous solution.

The products thus obtained are all well soluble in water and the acidic solution is stable at normal temperature but develop turbidity gradually by heating, resulting in gel precipitation when the concentration is high. Preferably the solution is stored with addition of hydrochloric acid and used after dilution to a titanium concentration of $10^{-5}$ to $10^{-2}$ mol/l.

The fact that iron ions are useful in the pretreatment step was found from the result of experiments using glass plates with stains which resulted from baking wet plates after the coating with water-soluble titanium ester hydrolysate on a steel mesh. They exhibited unusually fast growth of the film around the stained areas with distinct interference colors on the background of colorless luster film. Some of original stained plates were extracted with concentrated hydrochloric acid, and the extract showed a blue color reaction to a test paper strip impregnated with potassium ferricyanate. The glass plates that remained after the extraction were subjected to a similar film formation test but only normal growth resulted without production of interference color.

The process wherein said stains had been produced was surmised: ferric and ferrous chlorides were dissolved respectively in glycerol and dehydrated by heating to obtain resinous condensates, which were then dissolved in deionized water to dilute solutions. Glass plates coated by hydrolysis in an aqueous solution of water-soluble titanium ester were immersed in the respective dilute solutions obtained above, and heated until gel precipitates were visible. The plates were then baked and subjected to heating in a titanium tetrachloride solution containing hydrochloric acid. The result proved a pronounced acceleration of the film growth. Similar trials were carried out using plates merely cleaned by cooking in a sodium hydroxide solution instead of those coated by the hydrolysis in titanium ester solution, with similar results. Thus, the coating with water-soluble titanium ester hydrolysate proved not to be indispensable, yet is advantageous for higher reproducibility and for the case of making designed patterns as will be described later. Therefore, the preferred pretreating step comprises both possible steps, which are combined in sequence.

The aqueous solution containing ferric or ferrous ions used in the pretreatment step is prepared by dissolving either a ferric or a ferrous salt, whose anionic part can be of any form, in deionized water. In the case of a ferrous salt, the presence of stannic ions tends to enhance the acceleration effect. In any case the presence of a minute amount of titanium is favorable, but excessive proportion thereof results in turbid film formation.

The condensation product of a liquid polyol and ferric or ferrous chloride which is preferably applied in the pretreating step, is obtained by dissolving one or both of these iron salts in a triol such as glycerol or a diol such as ethylene glycol, and then heating or dehydration. The co-presence of titanium and/or stannic ions is effective also in this case. A minute amount of titanium tetrachloride and/or stannic chloride can be added before the dehydration by heating. In the case of ferrous compounds there is virtually no limitation for the concentration because no coloration problem is involved.

In the case of ferric compounds, however, higher concentrations result in brown coloration of the substrate surface, the limit of the upper concentration being dependent on the acidity of the solution. The relation to the acid concentration is not straightforward and a fixed mole ratio between acid and iron can give rise to virtually colorless surface with a low iron concentration whereas with a higher iron concentration a colored surface is obtained. Appropriate selection of the composition allows colorless pretreatment, but even with coloration the resultant iridescent film may be of some ornamental value.

The pretreatment is carried out by soaking the object under heating.

Additionally, it is furthermore possible to bake the object at a temperature not exceeding its thermal deformation temperature prior to the nucleation or filmformation process; likewise, it is of course also possible to conduct the baking step afte the film-formation step and/or after the nucleation step.

If baking is implemented after the pretreatment step, the lustrous film resulting undergoes no change when baked again after film-formation.

The heating for pretreatment is carried out at a temperature near the boiling point, and the time of about 10 minutes is enough. Normally the end point can be judged by the formation of a small amount of gel precipitates. When a ferric salt is used, the solution color turns distinctly brown. The pretreated object is then preferably washed with fresh water prior to the nucleation or the film-forming step. When carrying out titanium dioxide deposition from the aqueous solution of titanium tetrachloride containing hydrochloric acid, siliceous objects such as glass may preferably be baked preliminarily at a temperature below its melting point or deformation temperature for 10-20 minutes, which favors better film finish and saves the fixing bake after the film formation.

After the pretreating step, optionally a nucleation step is performed for improving the film growth efficiency for proceeding the growth while maintaining the transparency of the mother liquor.

It was found that when the nucleation step is applied before the film-forming step the luster developed faster and mother liquid transparency lasted longer than in cases with pretreatment only.

Thus, there are two ways for the said nucleation step: the method (A) and the method (B). In the case of method (A), the pretreated surface is heated in an aqueous solution of a water-soluble titanium ester or a tri- or tetravalent titanium salt of a concentration not less than 0.1 mmol/l, followed by baking at a temperature higher than 300° C. The temperature and the time for heating in said solution can be judged by the precipitation of gel. For the baking a temperature as high as permissible is desirable. In the latter method (B), the nucleation is effected in the condition similar to that for the film-forming step. A lustrous film of e.g. golden or pink color (an "nd" of about 200 to 250 nm) can for example be attained when the reaction is continued till the surface is covered with free precipitates, which can be readily washed off and a smooth, lustrous, clear iridescent film of titanium dioxide appears upon complete removal. Accordingly, the film-forming step can be performed directly after the pretreating step or it can be a growth step in continuation of the nucleation step.

The film-forming process is conducted by using an acidic aqueous solution of a titanium ester or a tetravalent titanium salt such as, e.g. titanium tetrachloride, titanium nitrate, titanium sulfate, sodium titanium tartrate, titanyloxalate of ammonium or potassium, with a content of not less than 0.3 millimole Ti/l but preferably not higher than 30 millimole Ti/l and acidified by addition of either sulfuric acid, hydrochloric acid or nitric acid, or a mixture thereof, or other strong acids. For special applications higher concentrations than 30 millimole Ti/l sometimes are appropriate. A preferred embodiment of this invention is to perform the film-forming step twice or even several times, preferably a solution acidified with hydrochloric acid is used. Especially then, when an iridescent film thicker than 250 nm in "nd" is desired, or when the growth is proceeded under visual control of "nd" by tracing the change of interference color, the mother liquor is refreshed with the appearance of luster and turbidity development in the mother liquor as indicators. Normally, when the luster has fully developed (to an "nd" above 100 nm) or the mother liquor is apparently turbid, the object is taken out and the surface is cleaned for removal of the adhering precipitates, and then the reaction is resumed with fresh mother liquor. The timing of mother liquor renewal is decided by consideration of total reaction time and raw material efficiency. Earlier transfer into fresh mother liquor, as well as in the stage of golden interference color, can lead to growth of titanium dioxide film in priority to free nucleation. When the object is transferred to the fresh mother liquor, the restored titanium concentration and elimination of competition due to precipitate particles contribute to faster growth rate. The composition of fresh mother liquor can be the same as the starting mother liquor, or a higher titanium concentration can be employed. In any case the molar ratio of hydrochloric acid to titanium should be selected in the range between 5 and 200, and a titanium concentration no less than 0.3 mmol/l is employed. Generally when said molar ratio is fixed, the growth is faster with a higher titanium concentration. With a molar ratio smaller than 5, anatase tends to result, or further gel precipitation occurs. With a molar ratio greater than 200, normally the hydrolysis reaction does not proceed. Compositions that facilitate the control of "nd" lie in the range of hydrochloric acid concentration between about 0.1 N and 0.2 N, and titanium concentration range between 1 and 10 mmol/l. By properly selecting a composition and conditions for pretreatment and nucleation, the reaction can be continued to a stage of green iridescent film with an "nd" of about 650 nm with only once mother liquor renewal. More frequent renewals or continuous feed of more concentrated titanium tetrachloride solution, however, provides faster increase of "nd". When feeding continuously, a solution having a composition that enables sustenance of said molar ratio at a suitable value between 30 and 100 is employed, with a preferable feeding rate of about 0.1 mmol per squaremeter of substrate surface area per minute for titanium tetrachloride.

The reaction temperature of the film-forming step depends on the composition of mother liquor. Gradual film formation at normal temperature may be possible but film formation is extremely slow at temperatures below 50° C., which is impractical. By reaction at a temperature above 100° C. using an autoclave the growth of film can be accelerated much, but reactions under normal pressure have the advantages that the growth of the film can be traced visually. The preferred temperature is higher than 75° C. and is desirably close to the boiling point of the mother liquor or heating bath. Since the reflected light from the surface changes gradually as the "nd" increases, the reaction can be stopped at the point where the reflected light exhibits a spectrum corresponding to the target "nd", to obtain an titanium dioxide film of the desired "nd" value. The evaluation of "nd" from the reflection spectrum can be done precisely according to optics theory using a spectrophotometer. In practice, however, naked-eye observation of the color and intensity of reflected light can suffice the practical precision. For example, when the luster has developed to a half-minor state with a slight tint of bluish reflection the "nd" of the film is approximately 100 nm, and when the luster is at its peak with an appearance of silver mirror the "nd" is about 140 nm, and when distinct yellow reflection appears the "nd" is about 200 nm. For more precise nd estimation, a multitude of pretreated glass plates are put successively only by one into the mother liquor during reaction with a definite interval. The comparison of the time scale with the luster and color of the respective resultant glass plates can set up a graduation of specimens (with the plate of maximum reflection as standard) that enables to control "nd" with the precision of 10 units.

The heating mode employed in the film-formation process can be an indirect heating by means of hot water, a direct heating of the object containing the film-forming mother liquor, or heating an object wherein the heat source is put in the inside of the object which is submerged in the mother liquor.

In the case of direct heating, for example, when a glass vessel containing film-forming mother liquor is heated from the bottom, the bottom exhibits pink, blue or green reflection by formation of thicker interference film at the time the wall has uniformly formed silver-white lustrous film, indicating extremely fast growth of the film in the area of locally high temperature, which suggests the usefulness of an autoclave.

In the case of indirect heating, there is the advantage that a film of uniform thickness is obtained due to the homogeneous temperature condition.

The coating treatment using the water-soluble titanium ester is for the formation of a layer in abundance of titanium by deposition of the hydrolysate onto the object surface which is abundant in hydroxyl groups. It is interpreted that the surface hydroxyl groups react with the titanium ester and combine with the hydrolysate thereof to form a very thin layer of this hydrolysate. The surface abounding hydroxyl groups can be introduced on the surface not abounding hydroxyl groups per se, by modification with formation of a layer abounding hydroxyl groups, such as a silicate coating. In the case of organic polymer materials, not only such hydroxylabundant material as cellophane but also synthetic resins can be used as substrate after introducing on the surface hydroxyl groups by modification procedures well known in the art. Such procedure can be in some cases a simple treatment of the object with a NaOH-solution. Use of metallic substrates in this invention is also possible by complete covering of the surface with a compact coating layer of silica or silicate. The pretreatment using a resinous condensate of iron chloride and a liquid polyol can be understood in the same way. With siliceous substrate surfaces, it can be surmised that ferric or ferrous ions readily combine with such surfaces, from the fact that glass is apt to be colored in the presence of iron impurity. It is also easy to infer that iron can combine to the surface abundant in titanium from the fact that ilmenite, an ore for titanium, is composed of oxides of iron and titanium; conversely, titanium is apt to combine to a surface in abundance of iron. In this way a surface layer of mixed iron and titanium is formed on the object surface, and then nuclei are produced two-dimensionally over such layer by aforementioned pretreatment and nucleation steps successively carried out, resulting in distorted lattice for each nucleus, which facilitate spiral growth of crystals. In the case of ferrous ion which has virtually the same radius as the tetravalent titanium ion, electron exchange between these ions can take place resulting in creation of ferric and trivalent titanium ions, and so the above surmise is not contradictory. The observation that presence of stannic ions enhances the effect of ferrous ions seems also to sustain that. As a result the object surface is covered with nuclei capable of fast growth, and titanium dioxide deposits onto such nuclei in priority to free nucleation, and an optical film is formed.

When a low molar ratio of hydrochloric acid to titanium, or a high titanium concentration is employed, the hydrolysis rate of the whole system is higher than the deposition rate onto the surface, and free nucleation takes place within the mother liquor, and turbidity develops with the precipitates covering the surface. The precipitate particles covering the surface, however are not incorporated into the film, and the film growth proceeds independently. This can be construed as an epitaxial growth of titanium dioxide crystal on the substrate surface. It has not yet been completely proven that the formed titanium dioxide film is rutile, but chances for that are high due to the reaction conditions of acidity by hydrochloric acid and temperature near the boiling point of water.

As described above, this invention allows the formation of titanium dioxide film of uniform "nd" of a desired value with high reproducibility on the surface of a wide range of objects in a comparatively short span of time, and its industrial application requires no particular equipment. According to this method, the object can be drawn out in the course of reaction and restored in the reaction system after examination to continue the film growth, thus giving very convenient means for controlling the "nd". This not only allows the production of any desired interference color in the luster finishing of glassware, china, porcelain, polymers and other articles, but also the films of uniform "nd" giving rise to more distinct iridescent effect open the possibility of offering products of higher market values. Moreover, since application to the surfaces of any curvature or undulation, or even to the inside of a glass bottle or an electric bulb, which is almost a closed surface, is possible, the scope of application for luster finishing will be expanded, and development of new products that did not exist hitherto are possible. Further the technique of masking allows designed patterns to be produced by interference colors, which will offer a novel ornamental effect. In addition, since the method of this invention has no limitation for size in principle, it is applicable to such large objects as window panes, as well as such small objects as mica flakes and glass beads.

The facts that the control of "nd" is easy and the growth of film thickness is rapid are advantageous for optical and ornamental applications that involve multilayer films. When the method of Japanese Patent Publication Showa No. 49-46480, which the inventor disclosed, is combined such multilayer films as disclosed in the Japanese Patent Prepublication Showa No. 58-12564 can be realized without vacuum technique, and this invention can be utilized for antireflection coatings and interference filters.

Furthermore, using multiples of flat glass plates as temporary substrate for application of this invention, the resultant titanium dioxide films can be stripped into a sodium hydroxide solution by heating, leading to manufacture of nacreous pigments free from carriers such as mica flakes. The invention is also applicable to metal objects, by suitable coating of the surface with siliceous layer. It is also applicable to plastic objects by employing certain modification means that introduce hydroxyl groups.

The invention will be further explained in detail by the following examples. The scope of this invention, however, shall not be limited by these examples since only important representative cases are selected due to the versatility of applications and variety of the form, size and material of the objects, the varieties of possible combinations from various water-soluble titanate esters, various compositions for film-forming mother liquor, as well as the wide range of possible combinations between water-soluble titanium esters and iron compounds. The best conditions for a special problem can be found out by those skilled in the art according to standard methods.

EXAMPLE 1

(1) Preparation of titanium tetrachloride aqueous solution

In a 200 ml Erlenmeyer flask 35 g of titanium tetrachloride (reagent grade) is weighed and 20 g of deionized water is added by gradual dripping in a ventilated chamber. A yellow-white mass is formed once but a slightly viscous, dark yellow solution results when the whole portion of water has been added. Titanium concentration determined by gravimetric analysis is 3.5 mole/l.

(2) Preparation of glycerol titanate ester

A 3 g portion of the titanium tetrachloride solution prepared as above is weighed in a 50 ml beaker, and 3.6 g of glycerol (reagent grade) is added. After dissolution the mixture is heated on a hotplate and water is removed. Heating is further continued until glycerol vapor is recognized and the mixture has become very viscous. After cooling to room temperature a wax-like solid product is obtained. Adding 1 ml of deionized water it is mildly heated for dissolution, and then diluted to a total volume of 300 ml. Calculated titanium concentration is 35 millimole/l.

(3) Pretreatment of glass plates

A window pane glass plate is cut into pieces of a size about 5 cm×7 cm and put in a 300 ml beaker, then it is filled with 1 N sodium hydroxide for complete immersion of the plates. Between the plates are set suitable spacers to prevent the surfaces from sticking each other. After heating is a boiling water bath for about 20 minutes the plates are wiped in fresh water using a sponge, and then cut into pieces about 1 cm×5 cm; care not to touch the surface with naked finger. The pieces are stored in deionized water for use in the following examples up to Example 9.

In a test tube 10 ml of deionized water were added, an one drop (about 0.05 ml) of the glycerol titanate solution prepared in (2) and 4 drops (about 0.2 ml) of 10-times dilution of hydrochloric acid are dripped in and stirred. After putting a piece of glass plate taken from the above storage into the test tube, it is heated in a boiling water bath for about 30 minutes, then the solution is discarded, the plate is washed successively with fresh water and deionized water and dried before it it baked on a steel mesh heated by an electric heater for about 15 minutes. The baked plate is left for cooling.

(4) Formation of titanium dioxide film 3 ml of 50% sulfuric acid and 1 drop (about 0.05 ml) of the titanium tetrachloride solution prepared in (1) are filled in a 100 ml measuring flask and deionized water is added to the marker line to obtain 100 ml of a dilution with a titanium concentration of 1.75 millimole/l. The glass plate preteated in the above way is put in a test tube and this dilution is added till the plate is completely immersed. A 300 ml beaker containing hot water is put on a hotplate, and when the bath temperature is 80° C. the test tube is put in for indirect heating. After maintaining the 80° C. for about 15 minutes the glass surface assumes slightly bluish reflection. As the heating is continued the reflection intensity increases gradually and at about 30 minutes reaches a silvery white half-mirror appearance.

The glass plate is taken out of the test tube and washed with water. The lustrous film is firmly combined to the surface and does not come off by wiping. The plate does not change in its luster and transparency after heating again on a steel mesh for 15 minutes by means of an electric heater.

EXAMPLE 2

A titanium ester solution, 100 ml, was prepared according to (2) of Example 1 by substituting glycerol by 1.2 g ethylene glycol. Glass plates were pretreated in the same way as in Example 1 and tested for the formation of titanium dioxide film (will be referred to hereinafter as film formation), and the result was the same as in Example 1.

Further, equivalent amounts respectively of propyleneglycol, butanediol, diethyleneglycol and triethyleneglycol were tested in place of ethyleneglycol, and similar results were obtained.

EXAMPLE 3

Table sugar 0.2 g was used in (2) of Example 1 in place of glycerol by dissolution at normal temperature followed by dilution with deionized water to total 100 ml, and pretreatment and film formation were carried out successively according to Example 1. Formation of lustrous film on the glass surface was confirmed.

EXAMPLE 4

Sorbitol 1.2 g was dissolved under heating in (2) of Example 1 in place of glycerol, and a resinous product resulting after the removal of condensation water and hydrogen chloride was dissolved in deionized water to 100 ml. Using this solution, pretreatment and film formation were successively carried out and similar result was confirmed.

EXAMPLE 5

In (2) of Example 1 the amount of glycerol was changed to 0.6 g and 0.1 g, respectively, and similar solid product resulted. The product from the latter was dissolved in deionized water to 100 ml and stored in a glass bottle after addition of 40 ml hydrochloric acid. A 2 ml portion of this solution was diluted with 300 ml of deionized water and prtreatment and film formation were carried out in succession according to Example 1 and similar result was obtained.

EXAMPLE 6

A number of glass plates pretreated according to Example 5 were subjected to film formation test under various conditions of different mother liquor composition in the tricomponent system consisting of water, titanium tetrachloride and sulfuric acid, according to the procedure of Example 1.

EXAMPLE 7

In (4) of Example 1, titanium sulfate was used in place of titanium tetrachloride and a solution with a titanium concentration of 2.5 millimole/l and a hydrochloric acid concentration of 0.3 N was tested for film formation according to the procedure in Example 1. The result was the same as in Example 1.

EXAMPLE 8

(1) Preparation of titanate gel

A 1 g portion of the aqueous solution for titanium tetrachloride prepared in (1) of Example 1 was diluted with 50 ml of cold deionized water. Total 12 ml of cold 5% solution of sodium hydroxide were added gradually for precipitation of the gel, which was then filtered and washed with deionized water, and then put in a beaker.

(2) Preparation of sodium titanate tartrate solution 2.3 g of tartaric acid and 12 g of sodium hydroxide were added to the gel prepared above and stirred. The beaker was put in a hot water bath and stirring was continued until full dissolution. After filtration and washing with with deionized water, all filtrate and wash water were collected and addition of wash water was continued till the total volume of filtrate and wash water was 30 ml.

(3) Ammonium titanyl oxalate solution

To the gel obtained according to the above (1), 0.4 g of ammonium oxalate was added and heated for dissolution. After filtration it was diluted to total volume of 30 ml.

(4) Film formation

Each 0.5 ml portion of the solution prepared in (2) and (3) above is mixed with 0.5 ml of 50% sulfuric acid and 20 ml of deionized water to obtain a solution with titanium concentration of about 2.8 millimole/l. Film formation was carried out using each solution according to Example 1 and development of lustrous film was confirmed.

EXAMPLE 9

Glass plates pretreated according to Example 5 were put in five test tubes, and each test tube was filled with a sodium titanate tartrate solution acidified with sulfuric acid with the same composition as in (4) of Example 8. The test tubes were then put into a 300 ml beaker containing boiling water. Heating was continued for film formation. About 20 minutes later one test tube was taken out when slightly bluish lustrous film was formed. Further 10 minutes later the next test tube was taken out when the bluish tint disappeared. The third was taken out when the film grew to exhibit silvery mirror reflection with blackish shadow and the fourth when the lustrous film assumed yellowish tint, respectively, all four were allowed to cool. The last was left in the beaker and subject to continuing reaction even after the mother liquor became turbid, and was taken out when the film turned golden yellow. Each plate was washed after the cooling, and then baked at about 400° C. for five minutes. Resultant films had approximate optical thicknesses of 100 nm, 120 nm, 140 nm, 170 to 180 nm and 200 nm, respectively. The golden film of titanium dioxide may have some turbidity depending on the purity of mother liquid.

EXAMPLE 10

Patterned window pane was cleaned according to Example 1 and the pretreated according to Example 5. Film formation was carried out according to Example 9 and when turbidity developed in the mother liquor it was replaced with a fresh portion and the reaction was continued for about two hours. The film grew through reflection colors of yellow, pink, purple, blue and blue-green.

After washing and drying there was slight decline of color distinction from that in water, but the patterned glass plate exhibited clear blue-green reflection and pink transmission colors. Thus it is the remarkable characteristic of present invention that without being influenced by the undulation of the surface a titanium dioxide film of uniform "nd" for desired value can be obtained by a deposition reaction from an aqueous solution like in the metal plating.

EXAMPLE 11

A number of glass plates were cleaned according to Example 1 and washed successively with fresh water and deionized water while being kept in the cleaning beaker, which was filled with the pretreating solution of the composition in Example 5. It was placed in a steaming apparatus and heated to boil for 30 minutes in the state of a boiling bath. Then the plates were washed successively with fresh water and deionized water and wiped to remove water drops on the surface. The plates were returned to the beaker and film formation was carried out using the mother liquor composition of Example 9 and according to Example 10 where the transparency of mother liquor was maintained, until a golden film has developed. After cooling, the plates were washed and returned in the beaker, which was filed with 1 N sodium hydroxide and heated in a hot water bath for 30 minutes. Then the golden film came off into the solution to give a suspension of golden foil.

The glass plates were removed and suspended foils were settled and decanted. After washing with water a product of appearance similar to gold paste was obtained. It was mixed with an acrylic emulsion by gentle stirring and applied on paper. A golden coating resulted.

EXAMPLE 12

A wine glass was put into a 500 ml beaker and 1 N sodium hydroxide was filled to complete immersion of the glass, and cleaning of the surface was effected for 30 minutes in hot water bath.

Then the surface of the glass was wiped in fresh water using a piece of sponge with care not to touch the surface with naked finger. It was returned to the beaker which had been washed with water, and rinsed with deionized water together. Then filling the beaker with pretreating solution of the composition in Example 5, pretreatment was carried out by boiling for 30 minutes, followed by cooling, washing and drying. The glass was then baked in an oven maintained at about 400° C. for 15 minutes, cooled slowly, returned in the beaker which was then filled with the film-formation mother liquor of the composition in Example 9 and heated on a hotplate. When the mother liquor started to boil, the top of the beaker was covered with a watch-glass which carried cold water on top. About 40 minutes later silver-white film of titanium dioxide was formed on the whole surface of the glass. Resultant glass has nonesuch refreshing appearance and when poured wine was consumed interference colors appeared as water evaporated leaving a thin film of solid component in the wine.

EXAMPLE 13

In continuation of Example 12, the mother liquor was discharged and a solution of the following composition was filled in:

| | |
|---|---|
| No. 3 sodium silicate (Fuji Kagaku's product) | 1.0 g |
| ammonium chloride | 1.5 g |
| deionized water | 500 ml | and maintained at about boiling temperature for about two hours. Then the solution was discharged and the glass was washed and rinsed with deionized water, and again the beaker was filled with said pretreating solution of the composition in Example 5 and boiled for 30 minutes, followed by baking. Then film formation was repeated in the same way using the same mother liquor composition of Example 9. The initial silver-white lustrous film turned through yellow, copper, pink, purple in reflection with far less decline of luster than the case in Example 9, and the color became suddenly more distinct when blue-green color developed. The reaction was stopped at this point and the glass was washed, dried and baked. It exhibited distinct blue-green shine unseen in monolayer iridescent films with portions other than the highlight showing clear pink color.

By selecting suitable combination of "nd" for the titanium dioxide layers and "nd" for the silica layer, one can obtain various combinations of reflection and transmission colors, for example golden reflection with purple transmission or green reflection with magenta-colored transmission. Further, the above process can be repeated once more to obtain a quintuple-layer film which exhibits even stronger luster and more distinct colors.

EXAMPLE 14

Using a white porcelain vessel in place of wine glass in Example 13, far more distinct colors than by luster glazing was imparted to its surface, showing golden highlight on the background of purple color, the transmitted light being reflected by the white base.

EXAMPLE 15

A piece of cellophane sheet was washed with a detergent solution followed by wiping with cloth containing sodium bicarbonate solution and then rinsed with deionized water. It was heated for 30 minutes in the pretreatment solution of the composition of Example 1, followed by washing in water. Film formation was carried out in the same way as in Example 1 and lustrous film was formed on the cellophane surface.

EXAMPLE 16

A black natural stone was heated to 100° C. and soaked in a 7-times dilution of No. 3 industrial sodium silicate followed by immediate removal, for surface coating with sodium silicate film. I was then put in a 10% ammonium chloride solution and boiled for 30 minutes for fixing. The stone thus prepared was used for triple-layer blue-green film formation according to the procedure of Example 14. An artificial gem stone exhibiting blue-green metallic luster was obtained.

EXAMPLE 17

(1) Preparation of titanium tetrachloride aqueous solution

In an Erlenmeyer flask 70 g of titanium tetrachloride (reagent grade) is weighed, and total 40 g of deionized water is dripped gradually. After the addition of water is complete, a viscous, dark yellow solution is obtained. Its titanium concentration determined by gravimetric analysis is 3.5 mole/l.

(2) Preparation of glycerol titanium ester

A 3 g portion of the titanium tetrachloride solution prepared above is weighed in a 50 ml beaker, and 3.6 g of glycerol (reagent grade) are added. After dissolution the mixture is heated on a hotplate and water is removed. Heating is further continued until glycerol vapor is recognized and the mixture has become very viscous. After cooling to room temperature a wax-like solid product is obtained. After adding 1 ml of deionized water it is heated mildly for dissolution, and then diluted to a total volume of 300 ml. Calculated titanium concentration is 35 mmole/l.

(3) Preparation of ferric chloride stock solution 81 g of ferric chloride ($FeCl_3.6H_2O$, reagent grade) are dissolved in a mixture of 300 ml deionized water and 1 ml of 35% hydrochloric acid. Calculated iron concentration is 0.8 mole/l.

(4) Preparation of ferrous/stannic chloride mixture

In a 10 ml portion of the ferric chloride stock solution prepared above, 1 g of stannous chloride ($SnCl_2.2H_2O$, reagent grade) is dissolved. A bluish solution is obtained.

(5) Preparation of ferric-glycerol condensate

A 4.6 g portion of the ferric chloride stock solution prepared in the step (3) is mixed with 1 g of glycerol and heated to remove water. Heating is further continued until the mixture becomes very dark brown with release of glycerol vapor, and then it is cooled. The weight of the mixture has decreased to 1.3 g. After dissolving in 10 ml of deionized water, a solution with calculated iron concentration of 15 mmole/l is obtained.

(6) Cleaning of glass plate surface

Plates of a size 5 cm×7 cm are cut from a window pane glass and washed with detergent and rinsed, and then put into a beaker filled with 1 N sodium hydroxide solution. After boiling for about 15 minutes, the plates are washed in fresh water using a polyurethan sponge, cut into pieces about 1 cm wide with care not to touch with bare fingers, and are then stored in deionized water.

(7) Coating treatment with titanium ester

Eight pieces of the glass plates prepared in the step (6) are put into a 100 ml beaker in a random manner so that the surface should not stick each other. To 100 ml of deionized water 2 ml of 35% hydrochloric acid are added and then 0.5 ml of the glycerol titanium ester solution prepared in the step (2) are dissolved. The beaker is filled with this solution and a boiling water bath is applied. After about 30 minutes the glass pieces are washed with fresh water and stored in deionized water.

(8) Pretreatment

The ferric chloride stock solution prepared in the step (3) is sucked in a fountainpen filler and two drops (about 0.1 g) are added to 25 ml deionized water. In the same way one drop of 35% hydrochloric acid is further added. The resultant dilution has an iron concentration of about 3 mmole/l.

In the same way two drops of the ferrous/stannic chloride mixture prepared in the step (4) are added to 25 ml deionized water, to prepare a dilution of the same iron concentration as above.

A 2 ml portion of ferric-glycerol condensate solution prepared in the step (5) is diluted with 8 ml of deionized water, to obtain a 3 mmole/l dilution.

Three test tubes containing each one piece of the glass plate treated in the step (7) are respectively filled with the three dilutions prepared in the above to a level the glass piece is fully dipped. Then these are put into a beaker filled with hot water and kept boiling. Within about 10 minutes the ferric chloride dilution turns from light yellow to reddish brown, the ferrous/stannic mixture dilution precipitates a whitish gel, and the ferric-glycerol condensate dilution precipitates a brown gel. Each glass piece is then washed in fresh water, rinsed with deionized water, and then dried together with one piece of the glass plate stored at the step (7) as the control. After drying all pieces are baked on an electric heater for about 10 minutes. The glass pieces treated with ferric compounds are brown but the one with ferrous/stannic chloride mixture is colorless.

(9) Titanium dioxide film formation

A stock solution with titanium concentration of 2.17 mmole/l and hydrochloric acid concentration of about 2 N is prepared by mixing 20 ml of the titanium tetrachloride solution prepared in the step (1), 13 ml of 35% hydrochloric acid and 11 ml of deionized water. Four drops by fountainpen filler (about 0.15 ml) of this stock solution are put into a 100 ml measuring flask, then 3 ml of 35% hydrochloric acid are added and filled to the marker line with deionized water, to prepare a mother liquor having a titanium concentration of about 3.5 mmole/l, a hydrochloric acid/titanium molar ratio of about 86. In four test tubes the four pieces of glass plate baked in the step (8) are put separately and the mother liquor prepared above is poured to a level the glass piece is fully dipped. Then the test tubes are heated in a beaker filled with water which is kept boiling. After about 10 minutes the glass piece treated with the ferric compounds have developed lustrous films with a greenish blue interference color, and the piece treated with ferrous/stannic chloride mixture was developed a colorless lustrous film, but the control glass piece which had been treated only at the step (7) required heating for longer than 24 minutes before the development of luster. The mother liquors for the glass pieces treated with the ferric compounds maintained their clarity for longer than 20 minutes whereas the rest developed turbidity within 15 minutes.

EXAMPLE 18

Using the ferric chloride solution and the titanium tetrachloride stock solution prepared respectively in the steps (3) and (9) of Example 17, the following pretreatment solution is prepared:

| | |
|---|---|
| ferric chloride stock solution | 13 ml |
| titanium chloride stock solution | 1 drop (about 0.04 g) |
| 35% hydrochloric acid | 3 ml |
| deionized water | 180 ml |

Dilutions of respectively 2, 5, 10 and 20 folds are prepared from this pretreatment solution, and tested for film formation according to the procedure described in Example 17, using glass pieces prepared in the step (6) of Example 17. With the lesser dilutions the appearance of luster and development of interference colors are faster, but accompanied by a more brown coloration. With the 20-fold dilution (about 2.7 mmole iron/l) the coloration was practically not observed and distinct luster has developed within about 10 minutes with concomitant development of turbidity in the mother liquor. After about 30 minutes heating this glass piece exhibited transparent golden reflection and weak bluish transmission colors when cleaned of the surface.

EXAMPLE 19

In a 50 ml beaker 5 g of titanium trichloride (reagent grade) are weighed, and 5 g of glycerol and 5 g of deionized water are immediately added and mixed. Resultant opaque, purple mixture is heated to remove water and then cooled to obtain a resinous solid of dark green color. Adding deionized water, it is then dissolved and diluted to a total volume of one liter. Using this solution in the place of the glycerol titanium ester prepared in the step (2) of Example 17, glass plates are treated and tried for film formation according to the procedure from the steps (7) to (9) of Example 17. The result was similar to that of Example 17.

EXAMPLE 20

(1) Preparation of ferrous chloride stock solution

Ferrous chloride crystals (reagent grade) 60 g are dissolved in 300 ml deionized water containing 1 ml of 35% hydrochloric acid, to prepare a stock solution with an iron concentration of about 0.8 mole/l.

(2) Preparation of ferrous-glycerol condensate

A 7 g portion of the stock solution prepared in the above and 1 g of glycerol are mixed and heated to dehydration, and a yellowish, viscous product is obtained. Adding about 10 g of deionized water for dissolution, a total solution of 12.8 g with an iron concentration of about 0.45 mole/l is obtained.

(3) Pretreatment and film formation

Using a fountainpen filler 15 drops of the solution prepared in the step (2) above are added to 50 ml of deionized water to prepare a dilution with an iron concentration of about 9 mmole/l. Glass pieces prepared in the steps (6) and (7), respectively, of Example 17 are put into separate test tubes, and the dilution prepared in the above is filled in to a level each glass piece is fully dipped. The test tubes are heated in a boiling water bath for about 10 minutes and precipitation of whitish gel results. The glass plates, which are apparently unchanged, are washed with fresh water, rinsed with deionized water and then dried and baked before these are tested for film formation according to the step (9) of Example 17. All produced golden, lustrous films with no brown coloration of the glass.

EXAMPLE 21

A figured glass plate for window pane is cut into pieces 3 cm×4 cm, and each piece is treated according to the steps (6) and (7) of Example 17. To a 50 ml portion of 100-fold dilution of the ferrous chloride stock solution prepared in the step (1) of Example 20, four drops of ferrous/stannic chloride mixture prepared in the step (4) of Example 17 are added by fountainpen filler. The glass pieces prepared above are treated using this solution and baked on an electric heater, and then cooled slowly. With a 200 ml portion of mother liquor of the same composition as used in the step (9) of Example 17, a 50 ml beaker is filled and the glass pieces are put in and heated in a boiling water bath. After about 20 minutes luster developes on the glass surfaces accompanied by turbidity development in the mother liquor, which becomes half-opaque at about 30 minutes. The glass plates are then washed in fresh water and wiped with wet sponge, whereupon silvery lustrous surfaces appear. After rinsing with deionized water the glass plates are put into a fresh beaker and a portion of fresh mother liquor is added, and heating is repeated. Within about 10 minutes the glass surfaces turn yellow, and then through pink, purpole and blue, finally to greenish blue when about 30 minutes have passed, during which period the mother liquor has been kept clear. When some of the glass plates are transferred to another new beaker and further subjected ot continue the reaction with the mother liquor afresh, the lustrous film turns through bluish green, yellow, pink, purple and blue, to finally green. The period for purple and blue is rather short. The resultant plates exhibit uniform green reflection and pink transmission colors when cleaned in the same way as above, on both flat and patterned surfaces. The lustrous films do not come off from the surfaces when rubbed with a piece of cloth. By taking out the plate at any desired time, reflection color of either yellow, pink, purple, blue, blue-green or green yellow can be obtained.

EXAMPLE 22

Five drops of the titanium tetrachloride stock solution prepared in the step (9) of Example 17 are added by fountainpen filler to 20 ml of deionized water. Using this dilution of titanium tetrachloride and the ferric chloride stock solution prepared in the step (3) of Example 17, a pretreatment solution of the following composition is prepared:

| | |
|---|---|
| titanium tetrachloride dilution | 0.8 g |

| -continued | |
| --- | --- |
| ferric chloride stock solution | 1.4 g |
| 35% hydrochloric acid | 0.4 g |
| deionized water | 320 ml |

Using small hairpinned strips of stainless steel sheet as spacers, glass plates cleaned according to the step (6) of Example 17, are put into a 300 ml beaker vertically, and the above pretreatment solution is poured in to dip the plates. The beaker is heated in a boiling water bath until the solution turns reddish brown. After further heating for about five minutes the plates are transferred into fresh water and then rinsed with deionized water, dried and then baked on an electric heater for 15 minutes at 350°–400° C. The plates are cooled down and cut into pieces of about 1 cm wide. In the following examples until Example 25 these glass pieces will be used.

With varied amounts of 35% hydrochloric acid, deionized water and the titanium tetrachloride stock solution prepared in the step (9) of Example 17, mixtures of different compositions were prepared for mother liquor. Using the glass plates prepared above, these compositions were tested for film formation under boiling water-bath condition.

EXAMPLE 23

Glass pieces prepared in the Example 22 were subjected to the film formation according to the process described in the step (9) of Example 17. By reacting for 20 minutes, silvery, lustrous plates were obtained. After washing and rinsing, the glass pieces were put in five test tubes separately. Five different mother liquor compositions were prepared as follows:

| A: titanium tetrachloride stock solution | 2 drops |
| --- | --- |
| 35% hydrochloric acid | 30 drops |
| deionized water | to total volume of 50 ml |
| (titanium concentration | 8.5 mmole/l |
| hydrochloric acid concentration | 0.33 N |
| HCl/Ti molar ratio | about 39) |
| B: titanium tetrachloride stock solution | 9 drops |
| 35% hydrochloric acid | 32 drops |
| deionized water | 13 ml |
| (titanium concentration | 64 mmole/l |
| hydrochloric acid concentration | 1 N |
| HCl/Ti molar ratio | about 17) |

For the solution B the following dilutions were tested:

| solution B (ml) | $H_2O$ (ml) | titanium mmol/l | HCl N |
| --- | --- | --- | --- |
| 4 | 1 | 51 | 0.8 |
| 3 | 2 | 38 | 0.6 |
| 3 | 3 | 32 | 0.5 |
| 2 | 3 | 25 | 0.4 |

Five test tubes each containing one of the silvery glass pieces obtained above were filled with the above five different solutions respectively to dip the glass piece, and heated in a 500 ml beaker containing boiling water, for the observation of the titanium dioxide film growth. The solution A gave rise to golden reflection color at about 10 minutes of heating, then through copper, pink, purple, blue to finally blue green a process of iridescence development was observed, while the mother liquor transparency was maintained until about 30 minutes.

The four dilutions of solution B all gave rise to golden reflection color within five minutes, and were taken out at 10 minutes of heating. Stepwise colors ranging from blue-green to second-order yellow were obtained, each distinct and clear, with lesser dilutions resulting in faster growth.

EXAMPLE 24

Glass pieces prepared in Example 22 are treated according to the procedure stated in the step (7) of Example 17 and baked at 350°–400° C., and then cooled slowly. Using the mother liquor composition of the solution A of Example 23 these glass pieces were tried for film formation, and development of lustrous film followed by growth to golden film without mother liquor turbidity was confirmed.

EXAMPLE 25

Using a solution with titanium concentration of about 4 mmole/l prepared by adding one drop of the titanium tetrachloride stock solution of the step (9) in Example 17 to 20 ml of deionized water in the place of titanium ester solution, a trial similar to Example 24 was carried out. It was confirmed that a silvery, lustrous film was formed while transparency of the mother liquor was not affected.

EXAMPLE 26

A whisky glass was put into a 500 ml beaker filled with 1 N sodium hydroxide solution. For about 10 minutes the solution was maintained to boil and then stood to cool. With care that the surface should not be touched by bare fingers, the glass was washed using a sponge, and then rinsed with deionized water. Putting into the beaker again the glass is dipped in the ferrous pretreatment solution having the same composition as that in Example 21 and heated. As the temperature rose the solution turned slightly brown, then a minute amount of gel precipitated. After heating further five minutes the glass was cooled and washed, and put into a beaker again, the titanium ester solution the same as used in the step (7) of Example 17 was added to dip the glass, and heating was applied until gel precipitation was visible. Then the glass was washed, rinsed, dried and baked on an electric heater using a steel mesh as a blanket and an earthen pot as the cover. After baking for 30 minutes it was cooled slowly. Putting it again into a clear beaker, which was filled with a mother liquor having the same composition as the solution A of Example 23, heating was applied. The top of the beaker was covered with an Erlenmeyer flask filled with cold water with its neck fixed by an arm of a stand to provide a condenser, and refluxing was continued for 30 minutes, and a clear, golden glass was obtained.

EXAMPLE 27

A white porcelain dish of small size was cleaned in the same way as in Example 26, coating was applied according to the step (7) of Example 17, and then baked for 30 minutes according to the method of Example 26. After slow cooling down, a piece of sticker paper with nonaqueous adhesive was cut into a certain design, and applied on the surface of the dish as masking. Putting the dish into a 500 ml beaker, pretreatment and nucleation were carried out according to the procedure of Example 26. Then the dish was put in fresh water and the sticker was peaked off using a pair of bamboo pincers avoiding to scratch the surface. After rinsing with deionized water followed by drying, it was baked for 30 minutes. After cooling down slowly, film formation was then carried out in the same manner as in Example 26. When the unmasked parts were silvery, the masked area exhibited no luster at all. By refreshing the mother liquor and continuing the reaction until blue interference color was visible, a golden pattern on the blue background was obtained. Different color combinations can be obtained by selection of conditions such as mother liquor composition.

EXAMPLE 28

A piece of about 1 cm wide was cut out from an injection molded polycarbonate, soaked in 2 N sodium hydroxide solution and heated. After washing with fresh water a coating was applied by dipping in a mixture of each 1 g of ethyl silicate and 35% hydrochloric acid dissolved in 20 ml methanol. Baked at about 200° C. the piece was treated in the same way as in Example 21, and baked again at about 200° C. Then it was tested for film formation according to the step (9) of Example 17, and luster development was confirmed.

EXAMPLE 29

One gram of mica flakes was heated in 10 g of 1 N sodium hydroxide solution for 10 minutes, and particles larger than about 0.5 mm were separated by water sieving. A 10 ml portion of pretreatment solution of the composition of Example 21 was added and heated. After 10 minutes the flakes were decanted, washed and put in a stainless steel container for baking at about 400° C. Then the flakes were transferred into a 50 ml beaker and suspended in a portion of mother liquor of the composition in the step (9) of Example 17. The mother liquor was boiled under agitation, and in intervals of about 10 minutes the mother liquor was replaced with a fresh portion to observe the change in the flakes. Gradual increase of reflection indicating the formation of titanium dioxide layer on the surface was confirmed.

EXAMPLES FOR COMPARISON

Using glass pieces prepared according to the step (7) of Example 17, pretreatment trails were carried out with solutions of barium chloride, aluminum chloride, chromium chloride, manganese chloride, cobalt chloride, nickel nitrate, copper chloride, strontium nitrate. All failed to exhibit the effect.

I claim:

1. A process of forming a titanium dioxide film with controlled optical thickness on a surface comprising:
    (a) pretreating said surface by soaking in an aqueous solution containing an effective amount of a ferrous, ferric, stannous or stannic salt, or a mixture thereof; and
    (b) at least one film-forming step comprising, soaking said deposit obtained in step (a) in an acidic aqueous solution containing at least 0.3 millimole Ti/l.

2. Process according to claim 1 wherein the pretreating step is performed in a solution containing ferric or ferrous chloride together with a polyol.

3. A process of claim 1 wherein step (a) further comprises heating said surface in an acidic aqueous solution of a water soluble titanium ester or titanium salt.

4. Process according to claim 1 wherein the film-forming step is performed more than once.

5. Process according to claim 1 whereby the titanium dioxide film is formed on the surface of mica flakes.

6. Process according to claim 1 wherein the baking is performed optionally before and/or after the film-forming step.

7. A process of claim 1 wherein said solution of step (a) further comprising a polyol.

8. A process of claim 1 further comprising,
    (c) between steps (a), and (b) a nucleation step comprising soaking said pretreated surface in an acidic aqueous solution of a titanium ester and/or titanium salt containing at least 0.1 millimole/1, followed by baking at at least 300° C.

9. An article coated with thin titanium dioxide films according to the process of claim 1.

10. A process of forming a substantially uniform titanium dioxide film with controlled optical thickness on a surface comprising:
    (a) pretreating said surface by heating in an acidid aqueous solution of an effective amount of a water-soluble titanium ester or titanium salt, thereby forming a deposit on said surface; and
    (b) at least one film-forming step comprising, after removal of said surface from said solution, soaking said deposit obtained in step (a) in an acidic aqueous solution containing at least 0.3 millimole Ti/l.

11. A process of claim 10 further comprising between steps (a), and (b):
    (c) a nucleation step comprising soaking said pretreated surface in an acidic aqueous solution of a titanium ester and/or titanium salt containing at least 0.1 millimole/1, followed by baking at at least 300° C.

12. A process of claim 10 wherein said film-forming step is performed more than once.

13. A process of claim 10 wherein said titanium dioxide film is formed on the surface of mica flakes.

14. A process of claim 10 wherein said baking is performed before, and/or after said film-forming step.

15. A process of claim 10 wherein said film-forming step is conducted more than once.

* * * * *